Patented May 5, 1931

1,804,274

UNITED STATES PATENT OFFICE

JACQUES POBEREJSKY, OF BOIS-COLOMBES, FRANCE

PROTECTIVE LINING FOR TANKS

No Drawing. Application filed March 31, 1927, Serial No. 180,082, and in Belgium December 31, 1926.

It is well known that one of the problems which to-day occupies the minds of constructors of aircraft, is that relating to the protection of petrol tanks. These tanks must not permit the escape, nor the ignition of the dangerous liquid they contain, in the event of their being pierced by projectiles. After numerous vain researches, it was at last found that rubber, if used as a lining for tanks of this type, would increase their safety to a considerable extent due to its elastic properties which ensured the almost immediate stopping of the rent or tear made by the projectile, the edges of the rent tending to press firmly together automatically and thus close the perforation.

There was therefore no longer any hesitation in recognizing that a new safety factor existed due to the fact that the covering of rubber when brought into contact with petrol, at points where the inner receptacle was pierced, was dissolved by the petrol and became automatically "welded together." This circumstance, particularly favorable to the preservation of the tank and of the aircraft, formed the point of departure for new improvements; vulcanized rubber, which is less soluble in petrol, was replaced by raw rubber which is more easily soluble; the rubber being arranged in successive layers. The degree of solubility, due to the substance of the lining, then became a factor of vital importance, and it was of the utmost importance to substitute, for rubber, if possible, some material having, in general similar properties, but possessing, in addition a greater degree of solubility in petrol.

On the other hand the direful effects of low temperatures upon rubber were well known and also the effect of sudden changes in temperature.

These effects are particularly accentuated in the winter months, in cold climates, at high altitudes and in the cold induced by the velocity of the flight.

The elastic properties of the lining, exposed to conditions of this kind, are then considerably reduced and the rubber which constitutes it perishes very rapidly, losing the essential qualities which justified its use.

The present invention consists precisely, in partly or wholly replacing the rubber by a material which is more rapidly soluble in petrol, which is much less sensitive to the effects of cold, and which will retain these properties for practically an indefinite period notwithstanding that it may be exposed to air, light and inclement weather.

According to the invention, gum derived from "guayule" is used which affords complete satisfaction as regards all the before-mentioned desirable features.

"Guayule," known by the name of "*Parthenium argentatum*" is a tufted shrub growing in the northern regions of Mexico where it was discovered towards the middle of the last century. The plant contains in its cellular tissue, from the roots to its outermost extremity, the gum to which allusion has just been made and which also bears the name of "guayule." Of course the quantity of gum is not the same over the whole extent of the plant; at its minimum in the upper parts, it increases considerably in value proportionately to the proximity of the roots. The gum in question, considered in its pure and dry state, has the general properties of caoutchouc which is rather soft, because it contains other resins which are incorporated with the gum of the actual guayule in proportions attaining to 22%. The specific gravity of the resinous material is about .93.

In addition to the advantage of being more soluble in petrol, as already mentioned, guayule possesses, as stated above, other especially important advantages, as it will withstand and retain at low temperatures, the whole of its elastic properties. It does not deteriorate, its duration being almost unlimited. It will be easily understood that these two advantages, added to the principal one of solubility, give guayule an undoubted superiority over rubber so far as concerns the lining of tanks, the perforations or leakages of which have to be automatically stopped.

The processes for the extraction and preparation of guayule are already known and the invention does not in any way relate to these processes.

As has already been hereinbefore stated, the invention consists in the utilization of "guayule" as a fundamental substance to constitute a lining for aircraft tanks, such utilization also extending to any product resulting from the admixture or combination of guayule with natural or synthetic raw or vulcanized rubber, or with any other material suitable for the purpose.

The invention also includes any method of using guayule and every process for the application of the same, either separately or conjointly with another substance or material, especially rubber, for the lining of tanks, as hereinbefore mentioned.

In particular guayule, or a composition containing guayule, may be used in the form of a film applied directly against the wall to be lined, or it may be separated from said wall by means of canvas.

What I claim is:

1. A petroleum tank lined with a composition comprising guayule, being a substance extracted from a plant botanically known as *Parthenium argentatum*.

2. A petroleum tank lined with a composition containing guayule.

3. A petroleum tank lined with a composition of guayule and india rubber.

4. A petroleum tank lined with a rubber mixture containing guayule.

In witness whereof I affix my signature.

JACQUES POBEREJSKY.